No. 698,687. Patented Apr. 29, 1902.
T. DUNCAN.
ELECTRICAL MEASURING INSTRUMENT.
(Application filed Jan. 2, 1900. Renewed Jan. 6, 1902.)
(No Model.)
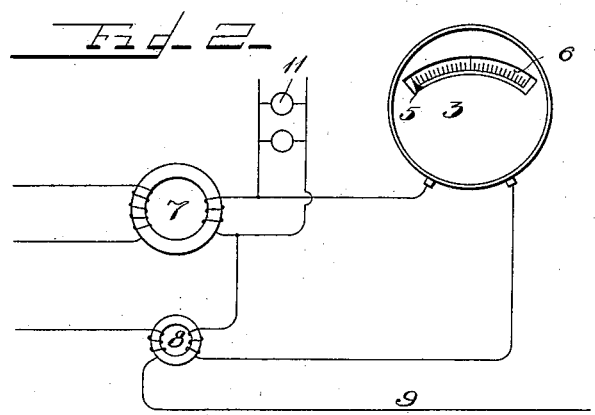
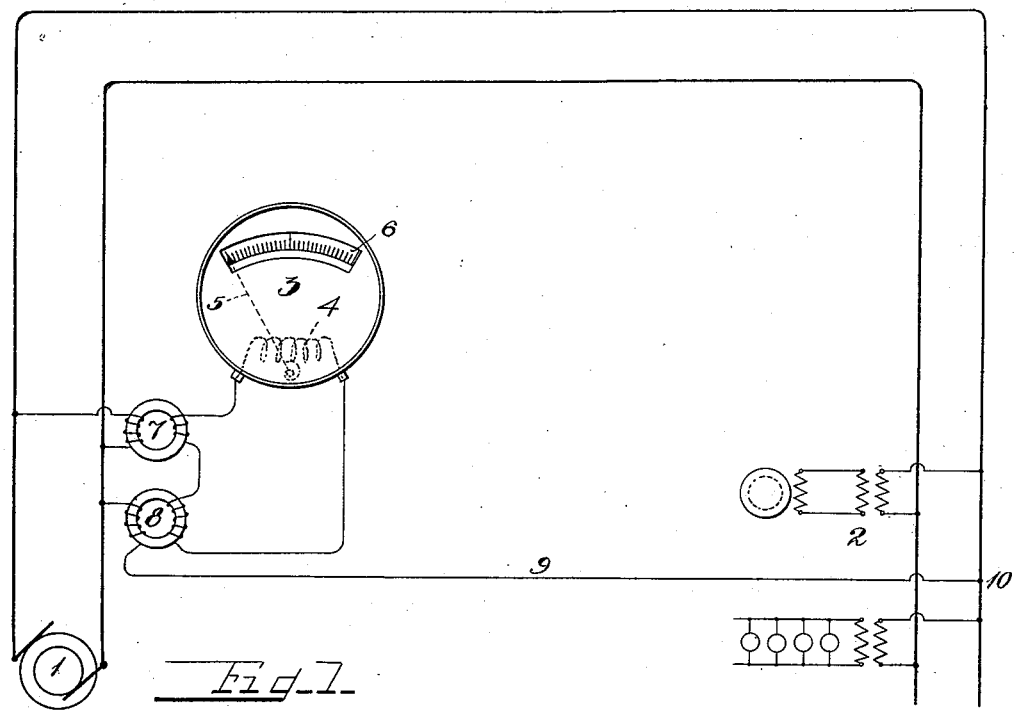

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,687, dated April 29, 1902.

Application filed January 2, 1900. Renewed January 6, 1902. Serial No. 88,493. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 353,) of which the following is a full, clear, concise, and exact description, reference being had to the accompanying drawings, forming a part of this specification.

My invention relates to compensating voltmeters, and has for its object the provision of improved means for determining the electromotive force at any predetermined point of a system of distribution, my invention enabling me to accurately secure this result.

When the pressure at any point distant from the generating-station is accurately determined, this pressure may be maintained constant by regulation of the impressed pressure to compensate for load changes and the C R drop over the distribution-lines due thereto, which varies directly as the load.

A method heretofore frequently employed for measuring the pressure at points distant from the generating-station in both alternating and direct current systems of distribution consisted in extending two pressure-wires from the distant point to the generating-station and there connecting the same with a voltmeter. When the distance to the distant predetermined point is great, the expense of these pressure-wires is significant when a great number of machines are used. It has also been the practice in measuring potential at distant points from a generating-station in alternating-current systems of distribution to employ a voltmeter connected in circuit with the secondary coils of transformers whose primaries are respectively included in series with the main transmission-line and between the transmission-lines. This latter method is, however, objectionable, since a true compensation is not always effected in the meter for the C R drop, since the effect of the series winding would be the same irrespective of the distance of the load from the generator.

In my application Serial No. 93, filed of even date herewith, I have disclosed a meter provided with two windings, one for interposition between the generator-terminals at the generator-station and the other for interposition between a point near the generating-station and a distant point of the line, whereby a pressure-wire leading to the distant point is dispensed with. By means of the apparatus disclosed in my said copending application I am enabled accurately to determine the pressure at the predetermined distant point of the transmission-circuit. It is the object of my present invention to secure the results obtained by my said copending application by the use of a voltmeter, which may have a single pressure-winding and which may be so connected in circuit that the instrument will indicate correctly the pressure at the predetermined point, so that any ordinary voltmeter may be employed to secure the desired measurement; and, generally speaking, my invention resides in means for accomplishing this result.

In practicing the invention I prefer to supply the winding of the meter with current conveyed from a conductor in a bridge of the transmission-conductors and also with current conveyed in a conductor between a point of a transmission-conductor near the generator and a distant point of the distribution-circuit.

I will explain my invention more particularly by reference to the accompanying drawings, illustrating the preferred embodiment thereof, in which—

Figure 1 illustrates a system of alternating-current distribution with a measuring apparatus connected in circuit therewith in accordance with the invention. Fig. 2 is a detailed view illustrating a modification of the apparatus shown in Fig. 1.

Like parts are indicated by similar characters of reference.

I have shown an alternating-current generator 1 as supplying current to translating devices 2. The voltmeter 3 may be of any well-known construction. I have indicated the winding 4 thereof in dotted lines and a pointer 5, actuated by the winding, which may be movable. A scale 6 is shown, upon which the pointer may indicate measurements. Transformers 7 and 8 are illustrated whose primaries are connected, respectively, between the transmission-conductors of the system at the generator-terminals and in a conductor 9, connected between a point near the generator and a second and distant point 10 of the transmission-circuit. I preferably include the primary of transformer 8 in bridge between the transmission-conductors, one point of connection being with one transmission-conductor near the generator, while the other is with the remaining transmission-conductor at the distant point where the pressure is to be determined, the primary of said transformer being subjected to a pressure equal to the generator-pressure minus one-half the C R drop—i.e., $E - \frac{CR}{2}$, where R equals the total resistance of the transmission-conductors between the generating-station and the distant point, E the impressed pressure, and C the current traversing the transmission-conductors. For example, if the generator impressed pressure is one thousand volts and the total C R drop is ten per cent. for a given load at the predetermined distant point 10 the primary winding of transformer 8 will be subject to a pressure equaling $1000 - \frac{100}{2} = 950$ volts. I therefore preferably so adjust the windings of the transformers that the ratio of transformation of transformer 8 is one-half that of transformer 7.

The secondaries of the transformers are included, preferably, in series with each other and with the winding 4 of the meter. The secondary windings of the transformers are preferably so connected that the electromotive forces due thereto oppose each other, whereby the winding 4 of the meter will be subject to an electromotive force which is the resultant of electromotive forces in the said secondary coils, this resultant electromotive force being proportional to the pressure at the predetermined distant point in the distribution-circuit.

If, for example, the translating devices should be subject to a pressure of one hundred volts in their normal operation, the secondary of transformer 7 may be wound for one hundred volts pressure and the secondary of transformer 8 may be wound for two hundred volts pressure, these coils being opposed. Thus a pressure is generated in the secondary of transformer 7 equaling one-tenth of the impressed pressure, while a pressure is generated in the secondary of transformer 8, which is equal to one-fifth of the impressed pressure minus the total C R drop.

Assuming, again, that the C R drop is ten per cent., although the primary of transformer 8 is subject to a pressure of nine hundred and fifty volts, the pressures which are generated in the secondaries of the transformers are proportional, respectively, to the impressed pressure and to twice the impressed pressure minus the total C R drop, as the ratio of transformation of transformer 7 is ten to one, while the ratio of transformation of transformer 8 is five to one. The secondary of transformer 7 will therefore generate a pressure of one hundred volts, while the secondary of transformer 8 will generate a pressure of one hundred and ninety volts. As these pressures oppose each other, the winding 4 of the meter is subject to a resultant electromotive force of ninety volts, which is the pressure at the translating devices at the point 10. The needle of the instrument is actuated to indicate this pressure.

Of course the pressures to which the winding of the meter is subject may vary in different instruments, it only being necessary to have this pressure upon the meter-winding proportional to the pressure at the predetermined distant point.

In Fig. 2 I have shown a transformer 7, such as is at present employed to reduce the pressure to which the meter-winding is subject and to furnish current necessary to supply pilot-lamps 11. In practicing my invention in connection with systems thus equipped I merely add the small transformer 8, including the secondary thereof, in series with the secondary of the larger transformer 7 and the voltmeter-winding, the electromotive forces of the secondary windings of the transformers being opposed.

It is obvious that changes may readily be made in the apparatus of my invention without departing from the spirit thereof, and I do not, therefore, wish to be limited to the precise apparatus herein disclosed; but,

Having thus described my invention, I claim as new and desire to secure by Letters Patent—

1. In a system of alternating-current distribution, the combination with an alternating-current generator, of two transformers, one having a primary winding connected in bridge of the distributing-mains at the generator, and the other having its primary winding connected in bridge of the distributing-mains, one of the connections of the latter winding being near the generator and the other being at a point of the transmission-circuit distant from the generator, and a voltmeter, the secondary coils of the transformers being included in series with each other and with the voltmeter-winding, the secondary coils of the transformers being arranged to have the electromotive forces generated therein opposed to each other, substantially as described.

2. In a system of alternating-current distribution, the combination with an alternating-current generator, of two transformers, one having its primary winding connected in bridge of the distributing-mains at the generator, and the other having its primary winding connected in bridge of the distributing-mains, one of the connections of the latter winding being near the generator and the other being at a point of the transmission-circuit distant from the generator, and a voltmeter, the secondary coils of the transformers being included in series with each other and with the voltmeter-winding, substantially as described.

3. In a system of alternating-current distribution, the combination with an alternating-current generator, of two transformers, one having a primary winding connected in bridge of the distributing-mains at the generator, and the other having its primary winding connected between distant points of the transmission system, and a voltmeter, the secondary coils of the transformers being included in series with each other and with the voltmeter-windings, substantially as described.

4. In a system of alternating-current distribution, the combination with an alternating-current generator, of two transformers, one having a primary winding connected in bridge of the distributing-mains at the generator, and the other having its primary winding connected between a point of the transmission-circuit near the generator and a second, distant point of the transmission-circuit, and a voltmeter, the secondary coils of the transformers being included in series with each other and with the voltmeter-winding, substantially as described.

5. In a system of alternating-current distribution, the combination with an alternating-current generator, of two transformers, one having its primary winding connected in bridge of the distributing-mains at the generator, and the other having its primary winding connected in bridge of the distributing-mains, one of the connections of the latter winding being near the generator and the other being at a point of the transmission-circuit distant from the generator, and a voltmeter, the secondary coils of the transformers supplying current to the voltmeter-winding, the secondary coils of the transformers being arranged to have the electromotive forces generated therein opposed to each other, substantially as described.

6. In a system of alternating-current distribution, the combination with an alternating-current generator, of two transformers, one having its primary winding connected in bridge of the distributing-mains at the generator, and the other having its primary winding connected in bridge of the distributing-mains, one of the connections of the latter winding being near the generator and the other being at a point of the transmission-circuit distant from the generator, and a voltmeter, the secondary coils of the transformers supplying current to the voltmeter-winding, substantially as described.

7. In a system of alternating-current distribution, the combination with an alternating-current generator, of two transformers, one having a primary winding connected in bridge of the distributing-mains at the generator, and the other having its primary winding connected between distant points of the transmission system, and a voltmeter, the secondary coils of the transformers supplying current to the voltmeter-winding, substantially as described.

8. In a system of alternating-current distribution, the combination with an alternating-current generator, of two transformers, one having a primary winding connected in bridge of the distributing-mains at the generator, and the other having its primary winding connected between a point of the transmission-circuit near the generator, and a second, distant point of the transmission-circuit, and a voltmeter, the secondary coils of the transformers supplying current to the voltmeter-winding, substantially as described.

9. In a system of electrical distribution, the combination with a generator supplying the transmission-circuit, of a voltmeter having an operating-winding, and means for subjecting the voltmeter-winding to pressure between the generator-terminals and pressure between a point of the transmission-circuit near the generator and a distant point of the transmission-circuit, substantially as described.

10. In a system of electrical distribution, the combination, with a generator supplying the transmission-circuit, of a voltmeter having an operating-winding, and means for subjecting the voltmeter-winding to pressure between the generator-terminals and pressure between distant points of the distribution-circuit, substantially as described.

11. In a system of electrical distribution, the combination, with a generator supplying the transmission-circuit, of a voltmeter having an operating-winding, means for subjecting the voltmeter-winding to pressure between the generator-terminals and pressure between a point of the transmission-circuit near the generator and a distant point of the transmission-circuit, and means whereby the said electromotive forces are opposed to produce a resultant electromotive force proportional to the pressure at the distant point to which the said meter-winding is subject, substantially as described.

12. In a system of electrical distribution, the combination with a generator supplying the transmission-circuit, of a voltmeter having an operating-winding, means for subjecting the voltmeter-winding to pressure between the generator-terminals and pressure between distant points of the distribution-circuit, and means whereby the said electromotive forces are opposed to produce a resultant electromotive force proportional to the pressure at the distant point to which the said meter-winding is subject, substantially as described.

In witness whereof I hereunto subscribe my name this 22d day of December, A. D. 1899.

THOMAS DUNCAN.

Witnesses:
WILLIAM F. MEYER,
JAMES W. DALTON.